Dec. 29, 1970     I. N. ELBLING ET AL     3,551,191

HERMETIC COMPRESSOR TERMINAL COATING

Filed Oct. 17, 1967

WITNESSES
Theodore F. Wrobel
Robert C. Baird

INVENTORS
Irving N. Elbling and
Newton N. Goldberg
BY Edward C. Arenz
ATTORNEY

United States Patent Office 3,551,191
Patented Dec. 29, 1970

3,551,191
HERMETIC COMPRESSOR TERMINAL COATING
Irving N. Elbling and Newton N. Goldberg, Pittsburgh, Pa., assignors to Westinghouse Electric Corporation, Pittsburgh, Pa., a corporation of Pennsylvania
Filed Oct. 17, 1967, Ser. No. 675,838
Int. Cl. B44d 1/20, 1/46
U.S. Cl. 117—229   3 Claims

ABSTRACT OF THE DISCLOSURE

Method of coating glass bushing portions of a hermetic compressor terminal with an epoxy resin composition by using an epoxy resin composition press formed into a compact with hole means therein to permit placing the compact on the glass bushings with the conductor pins received through the hole means, and then heating the terminal to melt the compact so that it flows down over the glass bushings and forms a coating thereover.

BACKGROUND OF THE INVENTION

Field of the invention

The invention relates to the art of making improved hermetic compressor terminals.

CROSS REFERENCE TO RELATED APPLICATION

Contemporaneously filed MacCarthy and Heitchue U.S. patent application S.N. 675,839 now abandoned, entitled "Improved Hermetic Compressor Terminal" is directed broadly to the concept of providing a resinous coating to glass bushing portions of hermetic compressor terminals for the purpose of preventing failures of the terminals through disintegration or other deteriorative failures of the glass.

SUMMARY OF THE INVENTION

We view our invention as providing an epoxy resin composition having properties lending itself to the practical application in large scale production, and in the provision of a method for practically applying the coating composition. In accordance with our invention, we employ a powdered epoxy resin composition which is press formed into discrete selected volume masses or compacts provided with holes therein to accommodate placing them upon the terminal with the conductor pins received through the holes. Then, heat is applied to the terminal to melt the coating composition and permit it to flow down over the glass bushings to cover and seal them and is then cured to a thermoset state.

The preferred form of the epoxy resin material is that of a powder which lends itself to easy handling because of its dryness, and may be readily formed into the apertured compacts. The epoxy melts down to form an impervious, relatively smooth coating bonded on the bushings to significantly lessen the chance of terminal failure.

DRAWING DESCRIPTION

PREFERRED EMBODIMENTS

Figure 1:
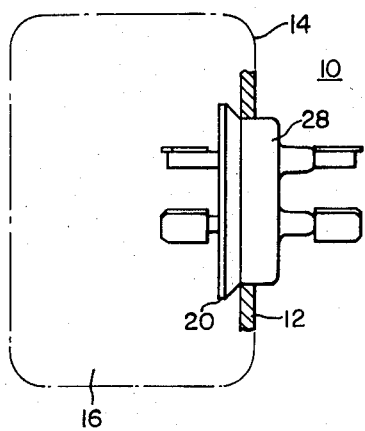
FIG. 1 is a side view of a terminal according to the invention as installed in a hermetic compressor shell wall with a broken line outline representing the major portion of the shell wall.
Figure 2:
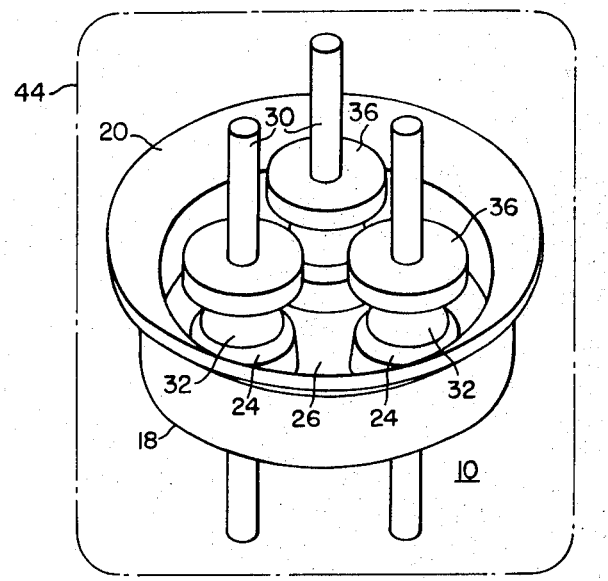
FIG. 2 is an isometric view of a terminal with epoxy resin compacts in place on each of the conductor pins and ready to undergo a heating step for melting and flowing the epoxy resin down over the bushings.

The terminal generally designated 10 in FIG. 1 is installed by sealingly welding it in an aperture in a wall 12 of the hermetic compressor shell represented diagrammatically by the broken outline 14. It will be understood that the compressor shell interior 16 contains a compressing unit and electrical motor (neither shown) in a refrigerant and oil atmosphere, as is conventional in such compressors.

The invention deals with the improvement of the conventional glass sealed terminal structure of the general type illustrated in Wyzenbeek U.S. Pat. 3,160,460. The terminal basic structure will be generally outlined as background for this invention. Thus, the terminal 10 shown in FIGS. 1, 2, 5 and 6, includes a metallic body portion including a side wall 18 provided with an outturned peripheral mounting flange 20, and an end wall 22 provided with collars 24 struck inwardly through the end wall. The inner and outer faces of the metallic body are denoted 26 and 28, respectively.

A conductor pin 30 extends through each of the collars 24 and is secured to the body in electrically insulated relation by the glass seal or bushing 32 encompassing the pin circumference for at least the axial length of the collars, and typically extending along some additional length of the pin as shown. The portion of the glass seal on the inner side of the body is, for the most applications, generally cone-shaped to provide a sufficiently long path from the exposed surface of the pin to the grounded collar.

Figure 3:
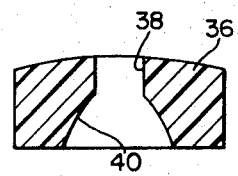
FIG. 3 is a sectional view through an epoxy resin compact in the currently preferred press formed shape.

In accordance with the invention, the insulating and protective coating 34 (FIGS. 5 and 6) overlying the cone-shaped glass bushing 32 is applied by the following method: The epoxy resin composition is preferably prepared from a powder formulated from epoxy resin, curing agents, pigments and fillers, prepared by the conventional techniques from either a dry blend or a hot melt. The general procedure is outlined in some detail in Elbling U.S. Pat. 3,039,987. A selected volume of the epoxy resin composition powder is preformed in powder form into a washer shaped compact 36 in a tablet forming press, in accordance with conventional practice, and is provided with a centered hole 38 (FIG. 3). The diameter of the hole 38 is preferably slightly larger than the diameter of the pin 30 (FIG. 2) which is received by the hole 38 when the tablet is placed in a seated position upon the apex end of the glass bushing 32. The pill 36 may also be formed with a deeply concave bottom surface 40 (as suggested by another, and as shown in FIG. 3) to insure that the tablet seats squarely during the melt down.

Figure 4:
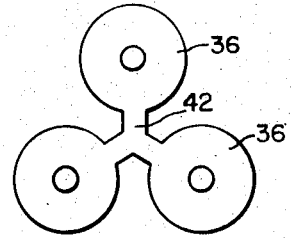
FIG. 4 is a top view of an assembly of three compacts formed as an integral unit to facilitate their application to the terminal.

In accordance with one aspect of the method according to the invention, one compact 36 is placed upon each of the pins 30 on the inner side of the terminal. In an alternative form of the method, the compacts 36 may be formed as shown in FIG. 4 in series of threes, with a spider 42 connected between the individual compacts. This obviously permits placing the compact unit upon a three conductor pin terminal.

Figure 6:
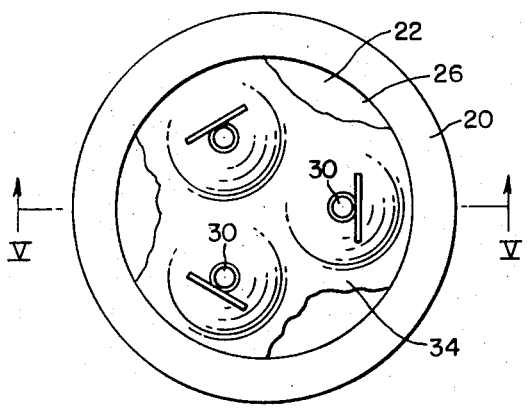
FIG. 6 is a face view of the inner side of a terminal coated according to the invention.
Figure 5:
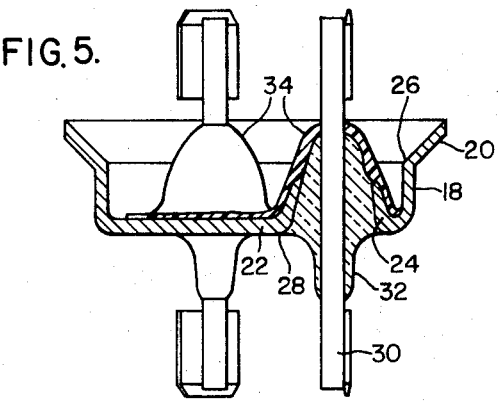
FIG. 5 is a sectional view corresponding to one taken along the line V-V of FIG. 6 of a finished terminal.

After the compacts have been placed on the conductor pins, the terminal is subjected to sufficient heat to melt the resin components of the composition so that the mass including the filler spreads and flows down over the glass bushing surface, and preferably over the collars 24 and covers and adheres thereto. The preferred extend of the coverage of the coating 34 is generally illustrated in FIGS. 5 and 6. Continuation of the heating causes the resin components to react quite rapidly to a thermoset solid.

The application of the heat to melt the compacts and subsequently cure the epoxy resin compositions may be carried out in various ways. In one way, the terminal with the compacts in place is placed in an oven 44 (FIG. 2) at a temperature sufficient to melt the particular epoxy resin composition, with the terminal then being maintained in a heated environment for a sufficient period to effect the cure of the epoxy resin composition.

In another way of applying the heat, principally by conduction, the terminal with the compacts in place is set on a heated plate having holes formed in the place to accommodate the outer side portions of the pins 30. The heat from the plate is conducted through the pins and the glass bushings to effect the melting and curing of the epoxy resin composition. Using the particular formulations of material set forth as the example in the noted MacCarthy and Heitchus copending application for example, the melting and complete curing can be accomplished by the use of a hot plate maintained at about 375° F. for one hour.

It will be appreciated that the amount of powder used for each compact is determined by the extent of coverage that is desired. While the coating thickness is not believed to be particularly critical, it is noted as a matter of interest that satisfactory results have been obtained by using an amount which provides a coating having a graduated thickness ranging from about 5 mils near the top of the bushing to about 35 mils near the bottom, the variation in thickness resulting from the slump occurring during meltdown.

In accordance with another method of applying the powdered epoxy resin compositions to form the coating, the powdered composition may be sprayed or dusted on a preheated terminal that is properly masked to exclude the coating from those portions of the terminal and conductor pins to which electrical connections must be made and which are welded to the compressor shell. This manner of application is, however, not the currently preferred method of application, having a number of obvious shortcomings.

The specific composition of the epoxy resin compositions which may be used is not considered to be critical to the invention so long as they possess those properties set forth as desirable in the noted MacCarthy and Heitchue application. The examples given therein are illustrative of two satisfactory powdered epoxy resin compositions. Example III of the noted Elbling Patent also teaches a powdered composition which may be satisfactorily used in carrying out our inventon. Accordingly, the teachings of the noted copending MacCarthy and Heitchue application, and the noted Elbling patent should be referred to for further details on the teachings pertinent to the preparation of satisfactory powdered epoxy resin compositions.

It is noted that while the dry powdered form of the epoxy resin composition is preferred, modification of the composition is preferred, modification of the composition to a form having a clay-like consistency may be desirable in some cases. Thus, the material of the first example set forth in the MacCarthy and Heitchue patent application may be modified by working in small percentage (e.g. about 2 to 2½% by weight) of a liquid epoxy resin such as Epon 828 available from Shell Chemical Co. The thus moistened composition compacts more densely than a powdered composition, and the liquid component serves a binding function making the compacts less brittle.

We claim as our invention:

1. The method of providing a protective coating on the glass bushing portions supporting and insulating lead-through conductor pin means of a hermetic compressor terminal, comprising:
   press forming an epoxy resin composition into at least one compact having hole means in said compact;
   placing said compact upon said bushing portions with said pin means passing through said hole means; and
   subjecting said compact and said terminal to sufficient heat to melt said compact so that it flows down over and coats said glass bushing portions and to cure the epoxy resin.

2. The method according to claim 1 including:
   forming one of said compacts for each glass bushing portion of said terminal.

3. The method of claim 1 wherein:
   applying said heat to the portions of said conductor pin means opposite those portions upon which said compact is placed.

References Cited
UNITED STATES PATENTS

| | | | |
|---|---|---|---|
| 2,512,426 | 6/1950 | Hartley | 29—501X |
| 3,188,720 | 6/1965 | Husni, Jr. | 29—501X |
| 3,214,403 | 10/1965 | Peerman | 117—21X |

ALFRED L. LEVITT, Primary Examiner

C. K. WEIFFENBACH, Assistant Examiner

U.S. Cl. X.R.

117—119.6, 120, 123